US009902927B2

(12) United States Patent
Slattery

(10) Patent No.: US 9,902,927 B2
(45) Date of Patent: Feb. 27, 2018

(54) FLUID CONTAINER ASSEMBLY WITH CORNER REINFORCING POSTS

(71) Applicant: FLEXTANK INTERNATIONAL LIMITED, Victoria (AU)

(72) Inventor: Phillip Henry Slattery, Victoria (AU)

(73) Assignee: FLEXTANK INTERNATIONAL LIMITED, Victoria (AU)

( * ) Notice: Subject to any disclaimer, the term of this patent is extended or adjusted under 35 U.S.C. 154(b) by 0 days.

(21) Appl. No.: 15/022,295

(22) PCT Filed: Sep. 26, 2014

(86) PCT No.: PCT/AU2014/000940
§ 371 (c)(1),
(2) Date: Mar. 16, 2016

(87) PCT Pub. No.: WO2015/042647
PCT Pub. Date: Apr. 2, 2015

(65) Prior Publication Data
US 2016/0237389 A1    Aug. 18, 2016

(30) Foreign Application Priority Data

Sep. 30, 2013 (AU) ............................... 2013903759

(51) Int. Cl.
*B65D 1/16* (2006.01)
*B65D 1/18* (2006.01)
(Continued)

(52) U.S. Cl.
CPC ................ *C12H 1/22* (2013.01); *B65D 1/16* (2013.01); *B65D 1/18* (2013.01); *B65D 19/385* (2013.01);
(Continued)

(58) Field of Classification Search
CPC .......... B65D 1/18; B65D 1/16; B65D 88/128; B65D 88/12
(Continued)

(56) References Cited

U.S. PATENT DOCUMENTS

| 406,246 A * | 7/1889 | Wacker | B65D 25/54 138/92 |
| 2,153,365 A * | 4/1939 | Conner | B21D 17/02 220/669 |

(Continued)

FOREIGN PATENT DOCUMENTS

| AU | 56077/96 A | 1/1997 |
| JP | H07-232191 A | 9/1995 |

OTHER PUBLICATIONS

International Search Report mailed in corresponding International Patent Application No. PCT/AU2014/000940 dated Dec. 18, 2014, consisting of 4 pp.
Written Opinion mailed in corresponding International Patent Application No. PCT/AU2014/000940 dated Dec. 18, 2014, consisting of 6 pp.

*Primary Examiner* — Reginald L Alexander
(74) *Attorney, Agent, or Firm* — Volpe and Koenig, P.C.

(57) ABSTRACT

A bulk fluid container assembly for maturing wines or other fluid beverages comprising, a container of molded polymeric material having a plurality of sides, a bottom and a top, wherein the sides are bowed inwardly with respect to the interior of the container, the top and bottom are bowed outwardly with respect to the interior, and the sides are joined to form corners, a separate base for supporting the bottom of the container, a corner reinforcing post for each of the corners, each corner reinforcing post extending from the separate base along one of the corners. It may have a base frame for receiving the tynes of a forklift.

19 Claims, 12 Drawing Sheets

(51) Int. Cl.
  *B65D 88/12*  (2006.01)
  *C12H 1/22*  (2006.01)
  *B65D 77/04*  (2006.01)
  *C12H 1/14*  (2006.01)
  *B65D 19/38*  (2006.01)
  *B65D 21/02*  (2006.01)
  *B65D 85/72*  (2006.01)

(52) U.S. Cl.
  CPC ..... *B65D 21/0209* (2013.01); *B65D 77/0466* (2013.01); *B65D 85/72* (2013.01); *B65D 88/128* (2013.01); *C12H 1/14* (2013.01)

(58) Field of Classification Search
  USPC ....... 220/601, 608, 613, 623, 628, 643, 647, 220/650, 661, 669; 99/277.1, 277.2
  See application file for complete search history.

(56) References Cited

U.S. PATENT DOCUMENTS

| | | | | |
|---|---|---|---|---|
| 3,661,293 | A * | 5/1972 | Gerhard | B65D 88/128 220/1.5 |
| 4,398,653 | A * | 8/1983 | Daloisio | B65D 90/205 108/53.1 |
| 8,413,835 | B2 * | 4/2013 | Flecknoe-Brown | B65D 51/16 220/565 |
| 8,646,641 | B2 * | 2/2014 | Moir | B65D 88/128 206/386 |
| 8,689,678 | B2 * | 4/2014 | Eustis | C12H 1/14 217/4 |

* cited by examiner

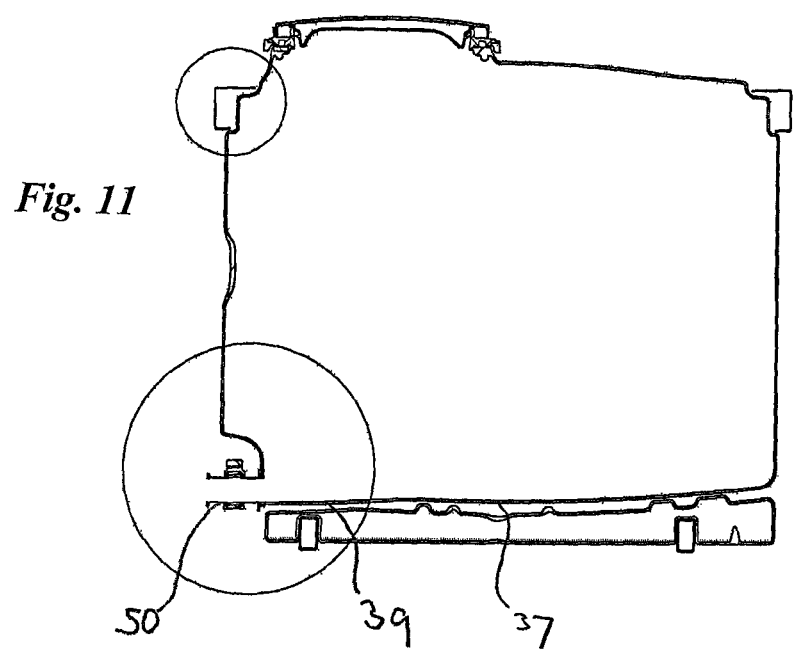
*Fig. 11*
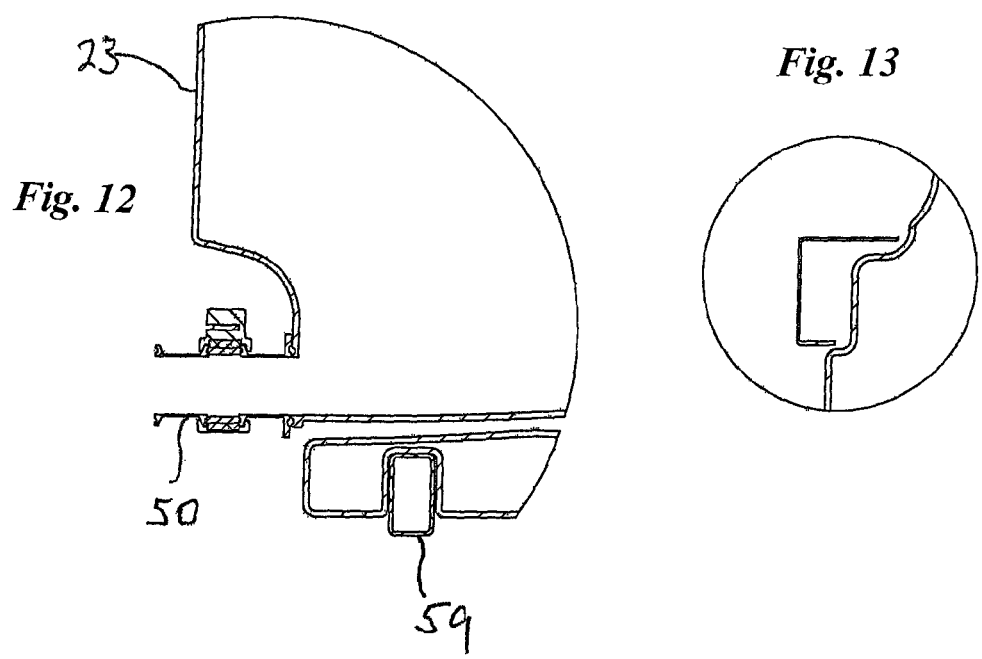
*Fig. 12*
*Fig. 13*

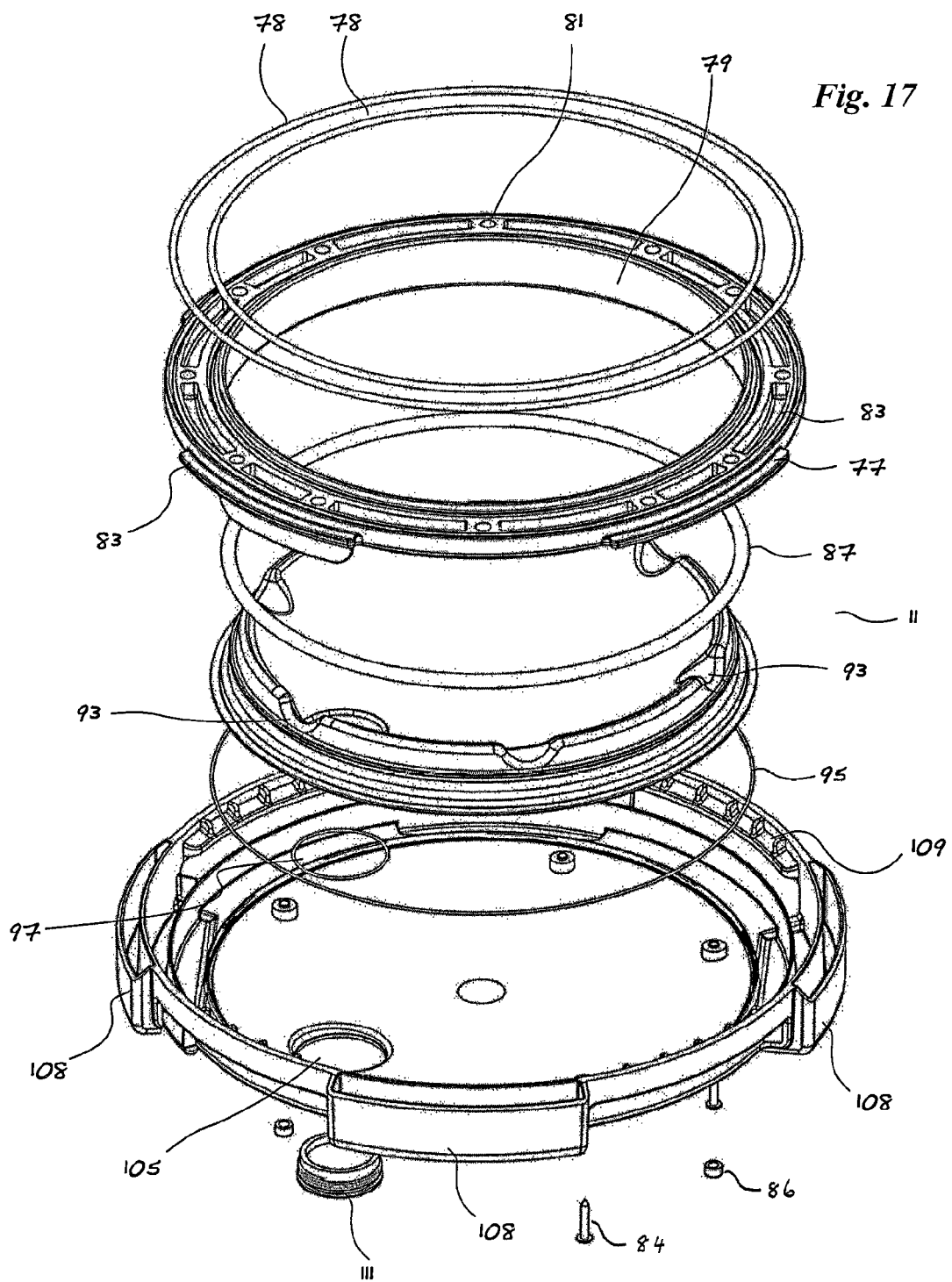

FLUID CONTAINER ASSEMBLY WITH CORNER REINFORCING POSTS

FIELD OF THE INVENTION

This invention relates to a fluid container assembly. It relates specifically but not exclusively to a fluid container assembly which may be suitable for maturing wines in bulk.

BACKGROUND OF THE INVENTION

Bulk fluid containers have been commonly used in industry. By bulk, we mean containers having a capacity typically between 500 liters and 5,000 liters, although much larger containers have at times been used for truck haulage.

One of the most common forms of bulk containers for fluids is one which has a footprint similar to that of a standardized pallet. This has obvious advantages for warehousing and movement by forklift trucks. Whilst there have been numerous designs of bulk fluid containers, they have generally been subject to compromises in their performance. For example, where the bulk containers have been formed of a polymeric material, the polymeric material may often be subject to bulging caused by the weight of the contents of the container. Over time this may become so serious that the container is no longer useable.

Some containers are unsuitable for long term storage of liquids such as wine because of characteristics such as high oxygen permeability.

Other disadvantages of some of the container designs include not being readily cleanable after each use and/or not allowing discharge of the contents under gravity.

The current invention seeks to provide a container construction which is advantageous in relation to at least one of the above identified considerations.

DISCLOSURE OF THE INVENTION

The invention provides, in one aspect, a fluid container assembly comprising,
- a container of moulded polymeric material having a plurality of sides, a bottom and a top, wherein the sides are bowed inwardly with respect to the interior of the container, the top and bottom are bowed outwardly with respect to the interior, and the sides are joined to form corners,
- a separate base for supporting the bottom of the container, and
- a corner reinforcing post for each of the corners, each corner reinforcing post extending from the separate base along one of the corners.

The polymeric material may comprise polyethylene. It may comprise high density, medium density or low density polyethylene. Preferably it comprises high density polyethylene. The container may be moulded using a rotational moulding process. Suitably, the container has a capacity of 500 liters to 5,000 liters. In one preferred form, the container assembly may have a footprint substantially the same as a standard pallet. The container may have a capacity of between 800 liters and 1,200 liters.

The sides of the container may be reinforced with side posts. The side posts may be located in recesses moulded in the external surfaces of the sides. Suitably, the recesses allow the side posts to fit snugly within them. Where the container capacity is between 800 liters and 1,200 liters, there may suitably be two posts in each side wall, each being located in a recess in the side wall. The side posts may extend from the separate base to a top assembly mounted on the container.

Similarly, the corner posts may lie in recesses formed in the corners. Suitably there are four sides and four corners. The bottom of the container may be shaped so as to direct all fluid to flow under gravity to a drainage opening formed at a front side of the container when the container assembly stands on level ground. For this purpose, the drainage opening is suitably located at a substantially central position in the front side of the container. It may be located in a recess so as to form protection for a tap fitted to the drainage opening.

The separate base may comprise a moulded base and a base frame. The moulded base may have an upper surface which substantially conforms to the contours of the bottom of the container. It may have a lower surface with recesses for receiving the individual members of the base frame. The base frame may have tubular legs for receiving the bottom ends of the corner posts.

Suitably, the top assembly includes means for holding the top of the corner posts. It may also include means for holding the top of the side posts.

The top of the container may include a closure assembly. The closure assembly may be formed in such a fashion as to allow the container to be accessed by two different sizes of openings. A first opening having a diameter of between 250 mm and 400 mm may be provided so that the interior of the container can be accessed by cleaning equipment. A second opening of smaller diameter may be provided in the closure assembly to allow filling.

Shaping of the top of the container is suitably arranged to ensure that air flows towards the first opening in the top as the container is filled. For this purpose, the top of the container may be bulged. It may include one or more ribs shaped to direct air from the top to the first opening. Similarly, the closure assembly may include air bleed ribs to direct air to the smaller second opening as the container is filled.

In one aspect, the closure assembly may comprise,
- a cap having a top panel joined to a circumferential skirt by a plurality of bridges separated by gaps,
- a closure base having a seal display and a plurality of projections, and
- a plurality of complementary projections provided on the inner surface of the skirt,
- wherein upon application of the cap to the closure base, and rotation of the cap relative to the closure base, the projections and complementary projections come into engagement to hold the cap onto the closure base and the seal display moves between a position where it is hidden behind one of the bridges to a visible position in a gap between bridges with rotation of the cap.

There may be a seal between the cap and closure base. The top of the cap may seal on the top rim of the closure base or a complementary annular circular sealing face of the closure base.

The projections and/or complementary projections may be elongate. They may comprise screw threads. They may comprise multi-start screw threads.

In a further particular aspect of the invention, the closure assembly for the container may comprise,
- a cap having a top panel joined to a circumferential skirt by a plurality of bridges,
- an opening in the top panel,
- a plurality of complementary projections provided on the inner surface of the skirt, an intermediate member having a top portion,
an annular sealing surface joining and rising from the top portion,
a neck formed on the top portion located to protrude through the opening,
a closure base with a complementary annular sealing surface adapted to telescopically receive the annular sealing surface,
a plurality of projections extending from the closure base, and
a sealing member applicable between the annular sealing surface and complementary annular sealing surface to provide a seal between the intermediate member and the closure base.

The sealing member may comprise an O-ring. Similarly, one or more O-rings may be used to provide a seal between the closure base and a finish surrounding an opening in the top of the container. Also, one or more O-rings may be provided to give a seal between the cap and the intermediate member.

Preferred aspects of the invention will now be described with reference to the accompanying drawings.

BRIEF DESCRIPTION OF THE DRAWINGS

FIG. 9 shows an enlarged view of the ringed portion of FIG. 8a;

FIG. 11 shows a section taken through the container of FIG. 8 slightly to the left of the section A of FIG. 7;

FIG. 12 shows an enlarged view of the bottom ringed section of FIG. 11;

FIG. 13 shows an enlarged view of the top ringed section of FIG. 11;

FIG. 17 shows an inverted exploded view of the closure assembly.

DETAILED DESCRIPTION OF THE PREFERRED EMBODIMENTS

Figure 1:
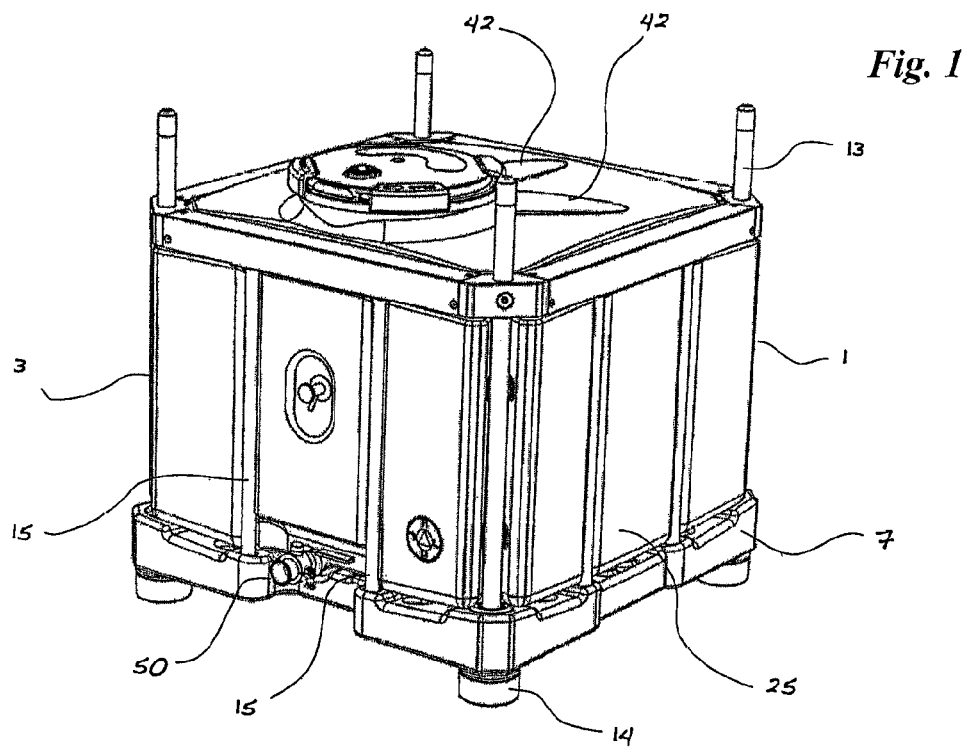
FIG. 1 illustrates an axonometric view of a fluid container assembly according to one aspect of the invention.

The various elements identified by numerals in the drawings are listed in the following integer list.

Integer List

Figure 2:
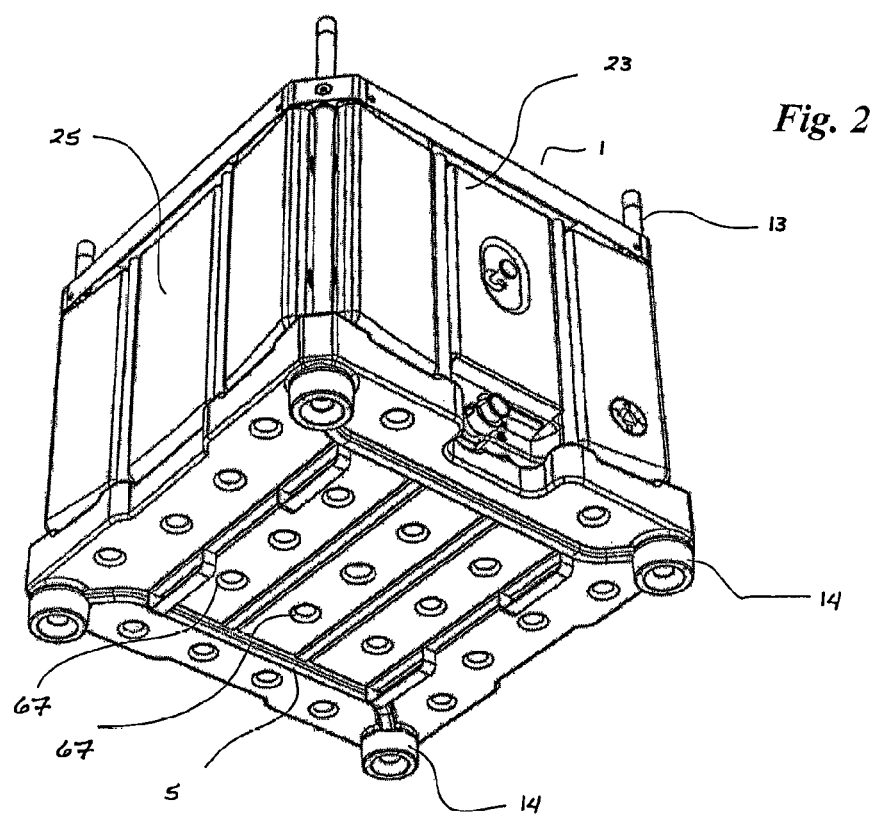
FIG. 2 illustrates an alternative axonometric view taken looking upwards from the base of the container of FIG. 1.
Figure 3:
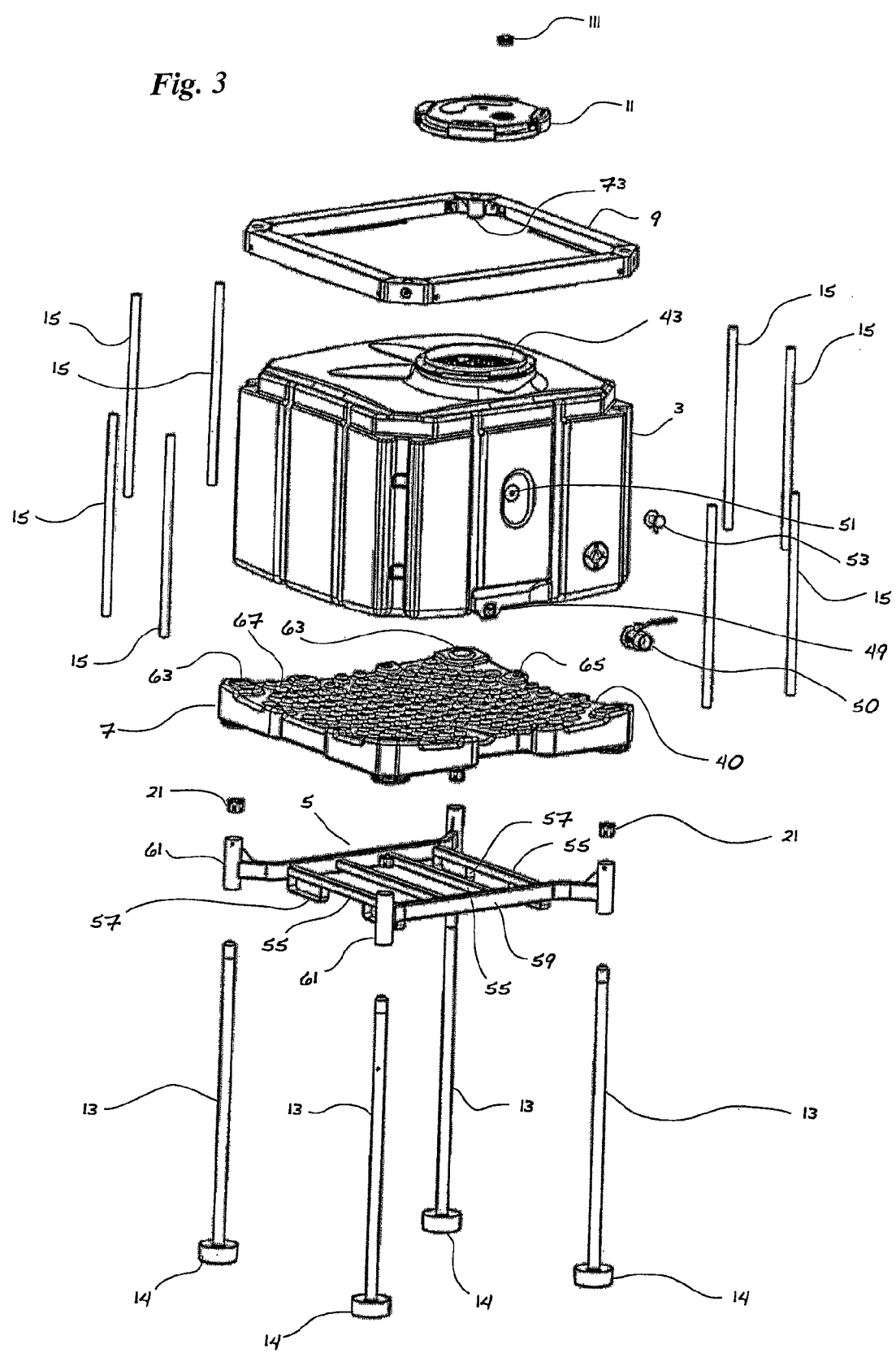
FIG. 3 shows an exploded view of the container of FIG. 1.

1 Fluid container assembly
3 Container
5 Base frame
7 Base
9 Top assembly
11 Closure assembly
13 Corner post/rod
14 Foot
15 Side post/rod
21 Socket member
23 Front wall
25 Side wall
27 Rear wall
29 Corner recess
31 Wall recess
33 Sample tap recess
35 Drainage tap recess
37 Bottom
39 Flow recess
40 Complementary recess
41 Top
42 Rib
43 Container mouth
47 Seal display
48 Gap
49 Drainage opening
50 Drainage tap
51 Sampling socket
53 Plug/tap
55 Cross bar
57 Hoop
59 Side bar
61 Tubular leg
63 Corner opening
65 Wall opening
67 Holes and/or stippling
68 Recess
69 Channel section
70 Locating return
71 Corner section
72 Corner screw
73 Tubular stub
75 Screw
76 Wide opening
77 Closure base
78 O-ring
79 Sealing surface
80 Sealing surface
81 Holes
83 Projection
84 Screw
85 Ratchet surface
86 Cover
87 O-ring
89 Intermediate member
91 Neck
92 Internal thread
93 Air bleed rib
95 O-ring
96 Upper perimeter
97 O-ring
99 Cap
100 Top panel
101 Locking lug
105 Opening 107 Skirt
108 Bridge
109 Complementary projection
111 Plug
112 Gap
113 Domed top Referring to FIGS. 1, 2 and 3 there is shown a fluid container assembly 1 according to one aspect of the invention, comprising a container 3 which may suitably be moulded of a polymeric material. The polymeric material may be polyethylene, preferably high density polyethylene, although low density or medium density polyethylene may be used depending on the characteristics needed in relation to the nature of fluids held in the container. It may be produced by rotational moulding, injection moulding or blow moulding. As a particularly preferred use is in relation to a base size comparable with standard sized pallets, it may typically have a capacity of 800 to 1200 liters. However for certain applications a broader range of sizes from 500 to 10,000 liters may be applicable.

For example, if the container is to be used to mature wine, the thickness of the container, based on the use of high density polyethylene, needs to be chosen to adjust the oxygen permeation rate of the container so as to give a rate of permeation similar to that achievable during maturation of wine in oak barrels, ie. the rate of oxygen permeation should be similar to that achievable with oak barrels having a range from 500 liters to 5,000 liters. This may equate to an oxygen permeation rate which lies between 7 and 35 mg of oxygen per liter per year at standard temperature and pressure. Where this is a requirement, in instances where the primary container is formed by rotational moulding of high density polyethylene, applicant's find that a thickness of container in excess of 4½ mm for containers ranging between 500 and 10,000 liters may be required to achieve satisfactory maturation of wine comparable with that achievable with oak barrels.

Whilst the foregoing discussion deals with a specific application for the container, namely wine, it is to be appreciated that the container may be used for a range of different fluids, some of which do not require the oxygen permeation storage conditions required for maturation of wine. This is particularly the case where the container is being used for short term storage or with other liquids such as spirits, oils, water, etc.

The container 3 is mounted on a base frame 5 by means of an intermediate base 7 shaped with recesses so as to snugly fit over the bars of the base frame and also shaped to receive the bottom of the container 3. As the bottom of the container 3 bulges outwardly, the base, is suitably dished so as to receive the bulging bottom 37 of the container 3. As seen more clearly in FIG. 11 the bottom of the base has a slope corresponding to that of the container through the central section to facilitate substantially complete drainage when the tap 50 is opened.

A top assembly 9 is mountable on the top of the container 3 and is configured so that the corner posts 13 protrude through the tubular legs 61 of the base frame and also through the tubular stubs 73 located on the corner sections 71 of the top assembly 9.

A closure assembly 11 is provided to seal off the container mouth 43 provided on top of the container 3.

Each of the corner posts 13 is provided with a foot 14. The bottom of the foot, as shown in FIG. 2, is shaped so as to receive the top of a corner post 13 of a similar fluid container assembly upon which the fluid container assembly may be mounted or stacked.

Side posts 15 are provided so as to extend between the base 7 and the top assembly 9. The side posts 15 are shaped to snugly fit within and along the wall recesses 31 provided at the front, side and rear walls 23, 25 and 27 of the container.

Similarly, the corner posts 13 are adapted to fit within the corner recesses 29. Both the side posts and corner posts serve to reinforce the container 3 against bulging of the container 3 when it is filled with fluid.

Each of the tubular legs 61 of the base frame 5 are provided with socket members 21. These are adapted to slide into the top of the tubular legs 61 so as to locate within the top of the tubular legs and snugly surround the corner posts 13 which protrude through the tubular legs 61 and are each joined to a foot by means such as welding.

A drainage tap 50 adapted to be fitted to the drainage opening 49 is provided at the bottom of the container and a plug/tap 53 is adapted to fit within the sampling socket 51 provided at an intermediate position on the front wall of the container 3.

Figure 5:
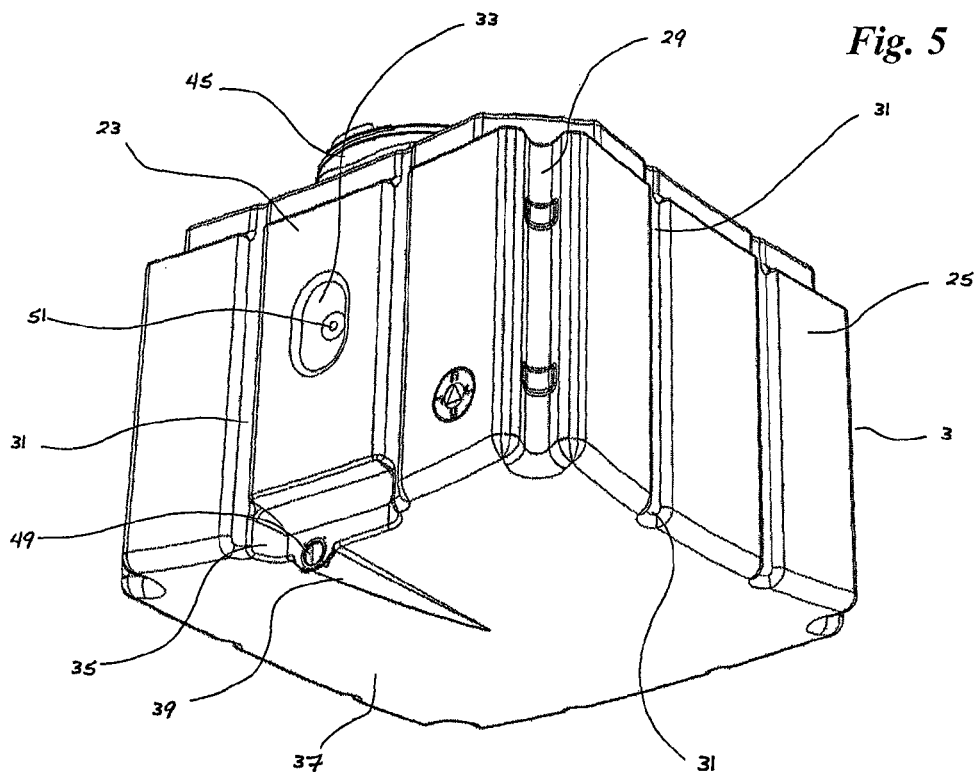
FIG. 5 shows an axonometric view of the container of FIG. 4.
Figure 4:
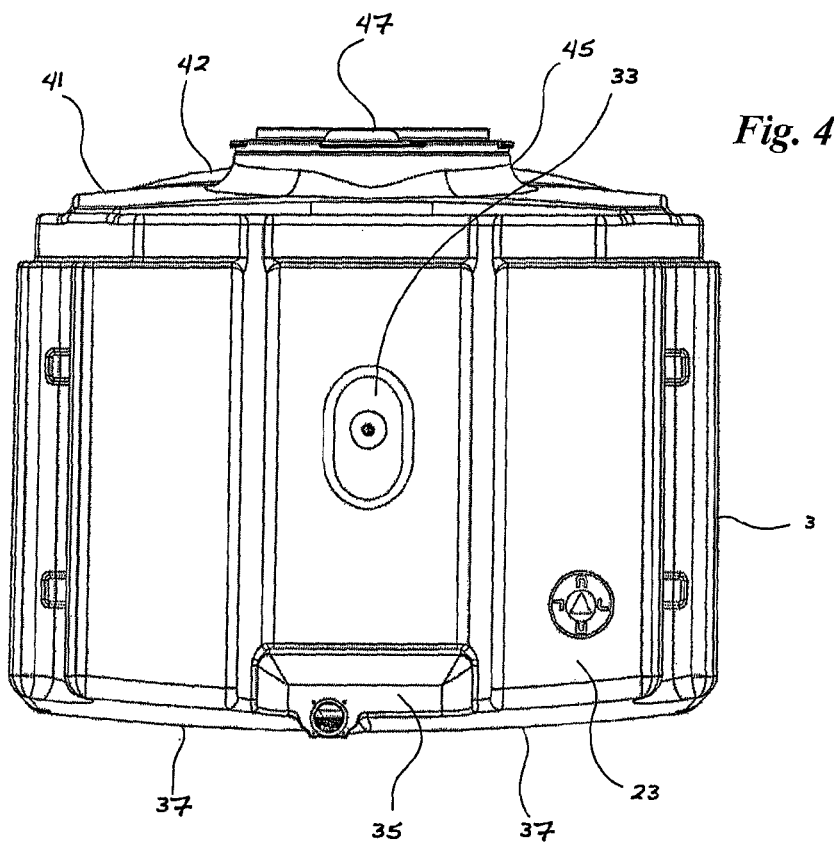
FIG. 4 shows an elevational view of a container used in the fluid container assembly of FIG. 1.
Figure 6:
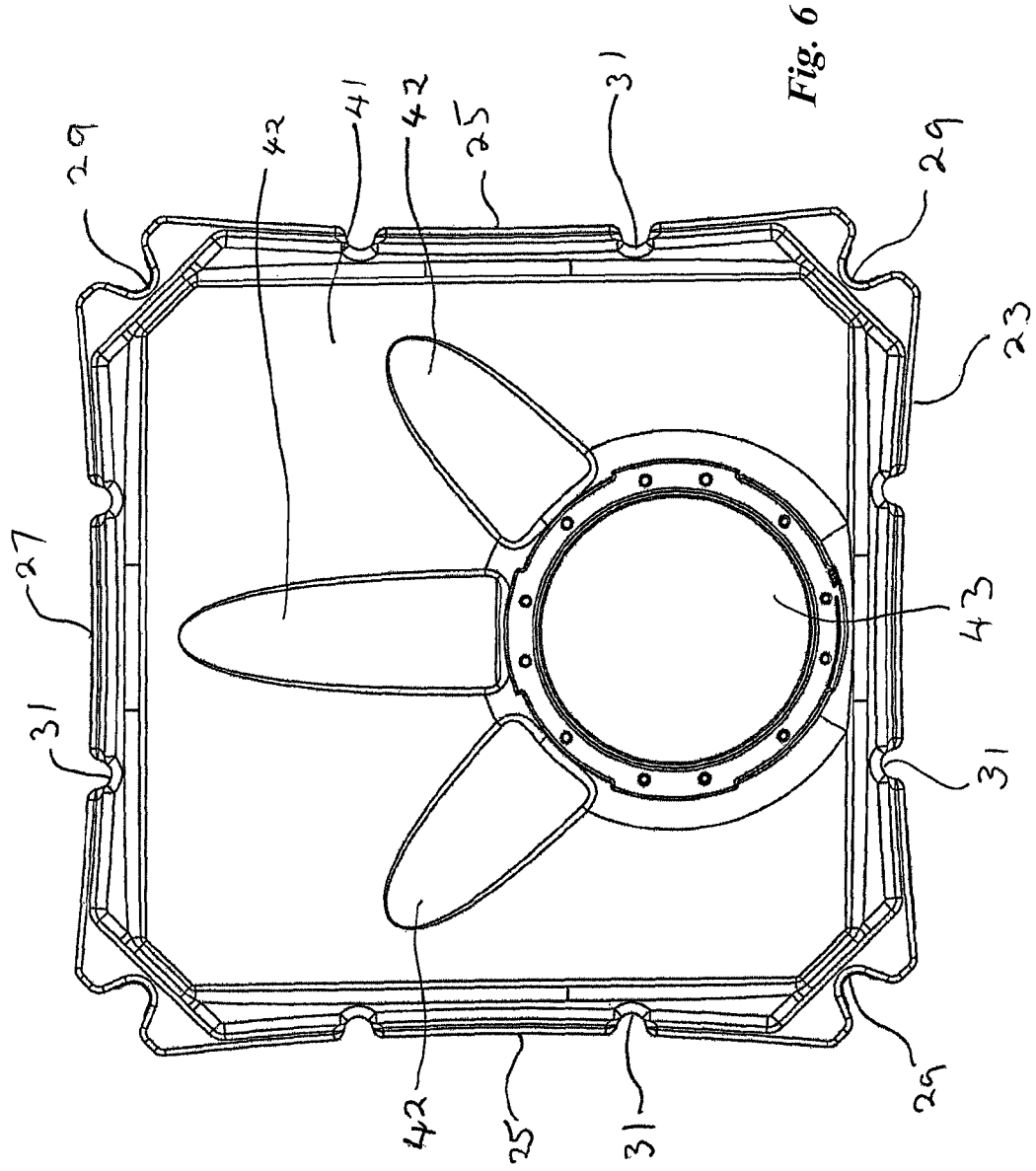
FIG. 6 shows a plan view of the container of FIG. 4.
Figure 7:
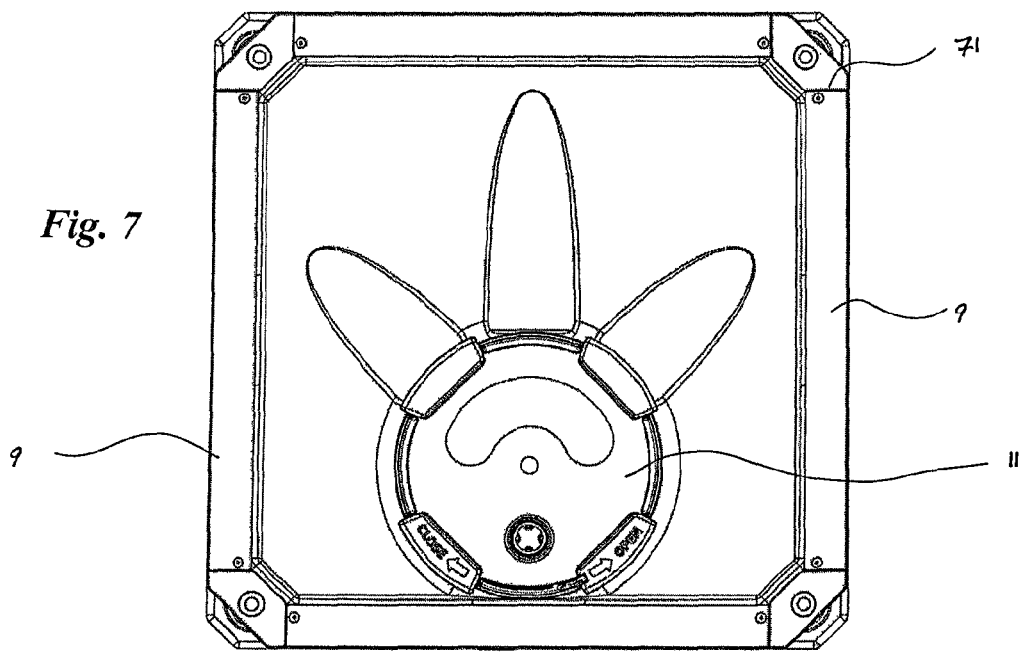
FIG. 7 shows a plan view of the container of FIG. 1.
Figure 8:
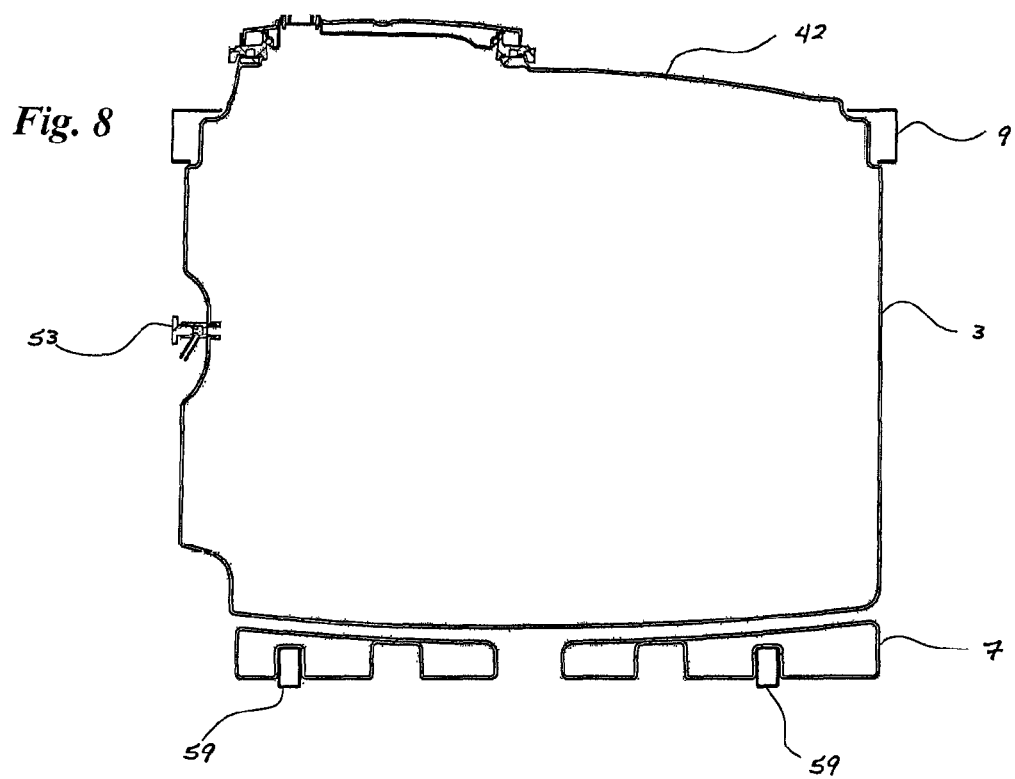
FIG. 8 shows the section A taken through the container of FIG. 7.

Referring to FIGS. 4, 5 and 6, it can be seen that the container 3 shown as a component of the fluid container assembly 1 in the earlier drawings, has sides shaped so that they bulge inwardly towards the contents of the container with the top 41 and bottom 37 of the container being bulged outwardly from the contents.

By having the sides bulging inwardly, and having them reinforced by the corner posts 13 and side posts 14 the resistance of the side walls to the outward pressure from the container contents is enhanced, thereby reducing the prospect of bulging and/or sagging of the container. Similarly, the outward bulging of the bottom 37 supported by the moulded base 7, apart from serving to distribute the load in the container across the base, also serves to facilitate drainage of fluid from the container. In this regard, the flow recess 39 terminating in the drainage opening 49 in combination with the dished bottom 37 of the container 3 serves to facilitate drainage of liquid from the container as and when needed. A complementary recess 40 provided in the base 7 is moulded to receive the flow recess 39 of the container 3 mounted thereon.

The drainage opening 49 is located in a drainage tap recess 35 provided so that a tap mounted to the drainage opening does not protrude substantially beyond the front wall of the container, thereby reducing the risk of accidental damage. Similarly, a sample tap recess 33 is provided centrally around sampling socket in the front wall of the container.

The top 41 of the container 3 is provided with ribs 42 shaped to increase the stiffness of the top 41 and also to assist with purging of air when the container is filled with liquid. This is particularly important where the contents of the container are such that they should be protected from spoilage by oxygen especially if the container is used to mature wine.

The container neck 45 is located adjacent to the ribs 42 whereby the ribs form a channel for evacuation of air through the container mouth 43 and finally through the neck 91 and opening 105 as the container is filled. The container mouth may typically have a diameter of 250 mm to 400 mm to allow access of cleaning devices to the container interior. A diameter of 325 mm to 375 mm is preferred.

The container neck has mounted thereon a seal display 47 which is arranged to be visible when the container has been properly sealed by the closure assembly.

Referring to FIGS. 1 to 3, the base frame 5 comprises a plurality of cross bars 55 which may be formed of steel or any strong metal joined to a pair of side bars 59. The side bars are in turn fixed to tubular legs 61 which are adapted to receive the corner posts 13. The cross bars are provided with hoops 57 for receiving the tynes of a fork lift. The hoops facilitate tilting of the container by a fork lift.

Referring to FIG. 3, the base 7 is provided with stippling and/or holes 67 to help locate the container 3 placed thereon and to allow drainage if necessary.

Along the sides of the base 7, there are provided wall openings 65 which serve to hold and locate the side posts 15. These wall openings 65 only protrude part of the way into the base 7. At the corners, there are also corner openings 63 extending completely through the base 7 to allow penetration by the corner posts 13.

Figure 15:
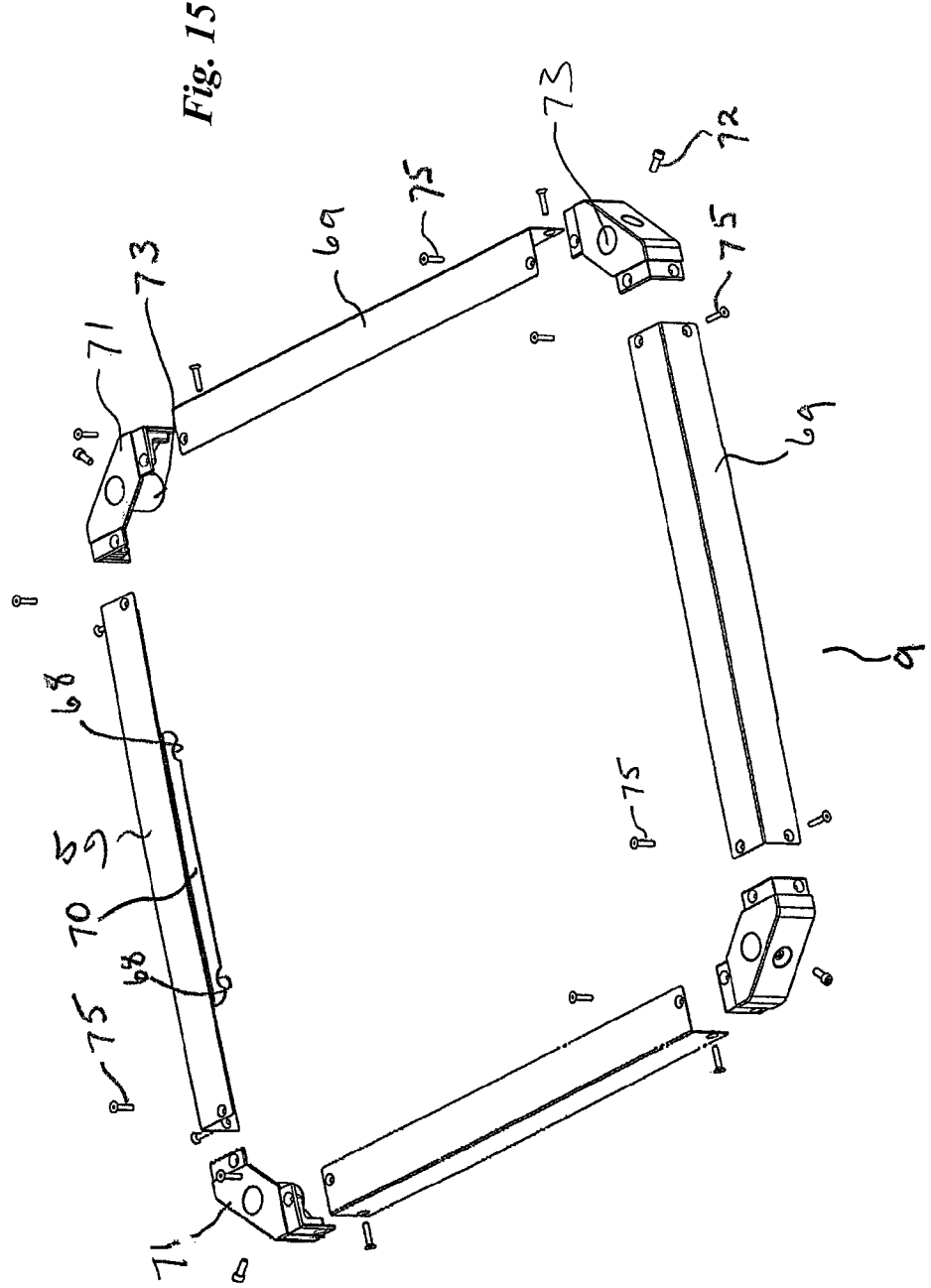
FIG. 15 shows an exploded view of the top assembly for the fluid container assembly.

Referring to FIG. 15, the top assembly 9 is shown as comprising four channel sections 69, each of which includes a locating return 70 adapted to hold the side posts in the recesses 68. The top of the channel section 69 overlies the top of the side posts to prevent them being displaced.

Corner sections 71 are joined to the channel sections 69 by a plurality of screws 75.

Each corner section has a tubular stub 73 through which the appropriate corner post 13 may protrude. When assembled, the corner screws 72 when screwed into the stubs 73, serve to secure the top assembly in place on top of the container thereby holding the whole fluid container assembly together.

Figure 9:
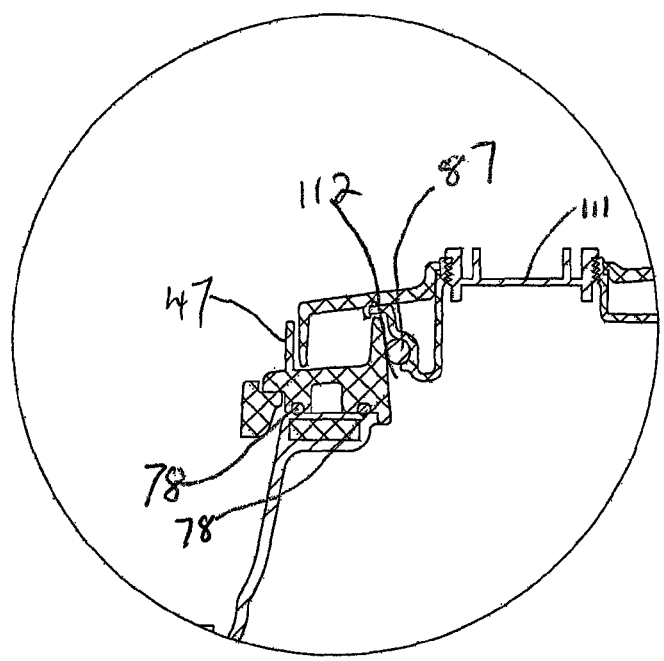
Figure 8A:
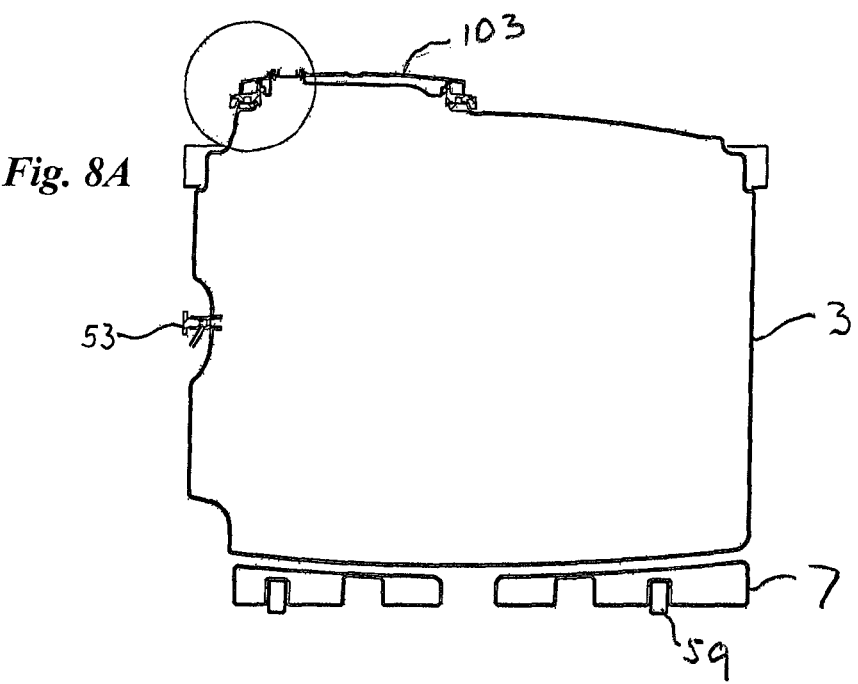
FIG. 8a shows the same view as that shown in Figure A with a ringed portion at the top of the container.
Figure 10:
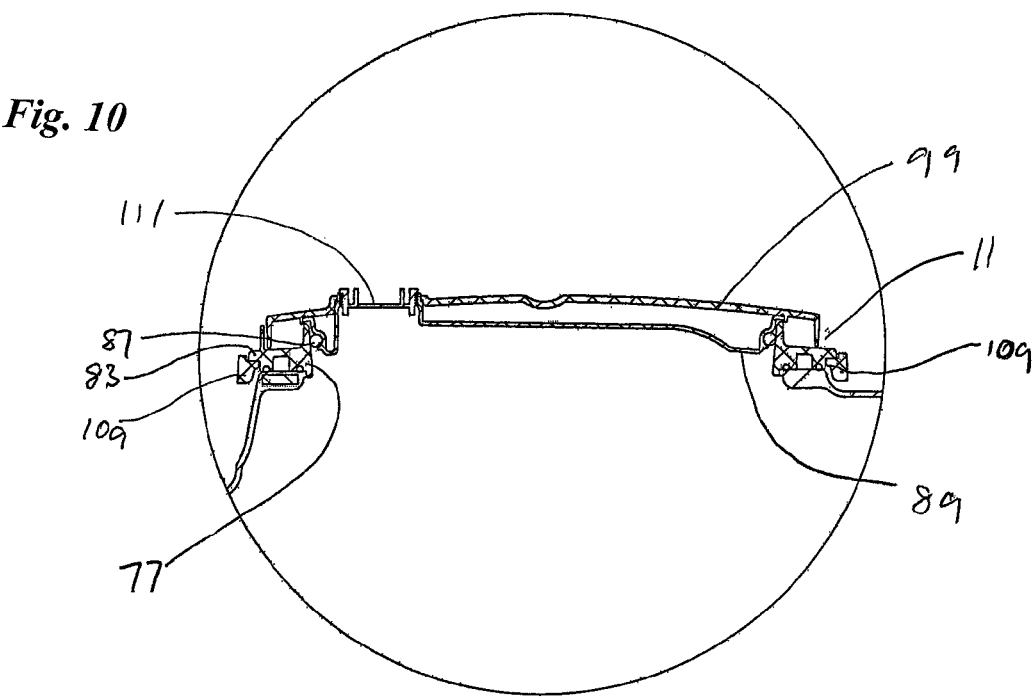
FIG. 10 shows an enlarged view of the ringed portion of FIG. 8b.
Figure 8B:
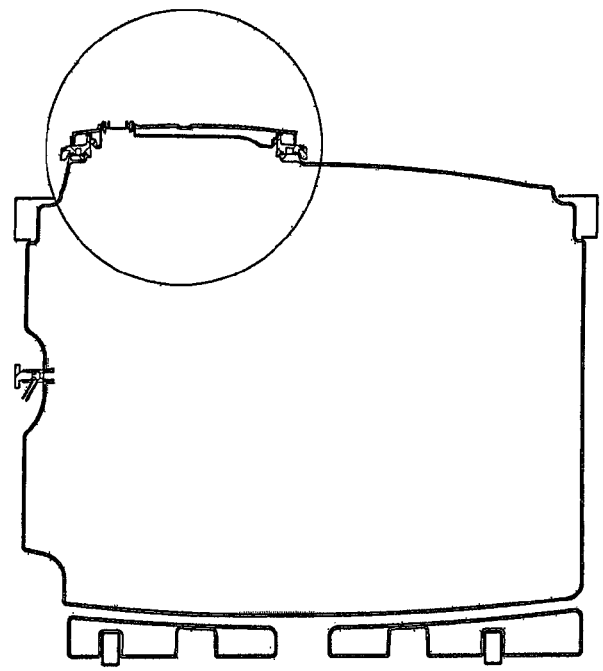
FIG. 8b shows the sectional view of FIG. 8 with a ringed portion around a portion of the top of the container.
Figure 14:
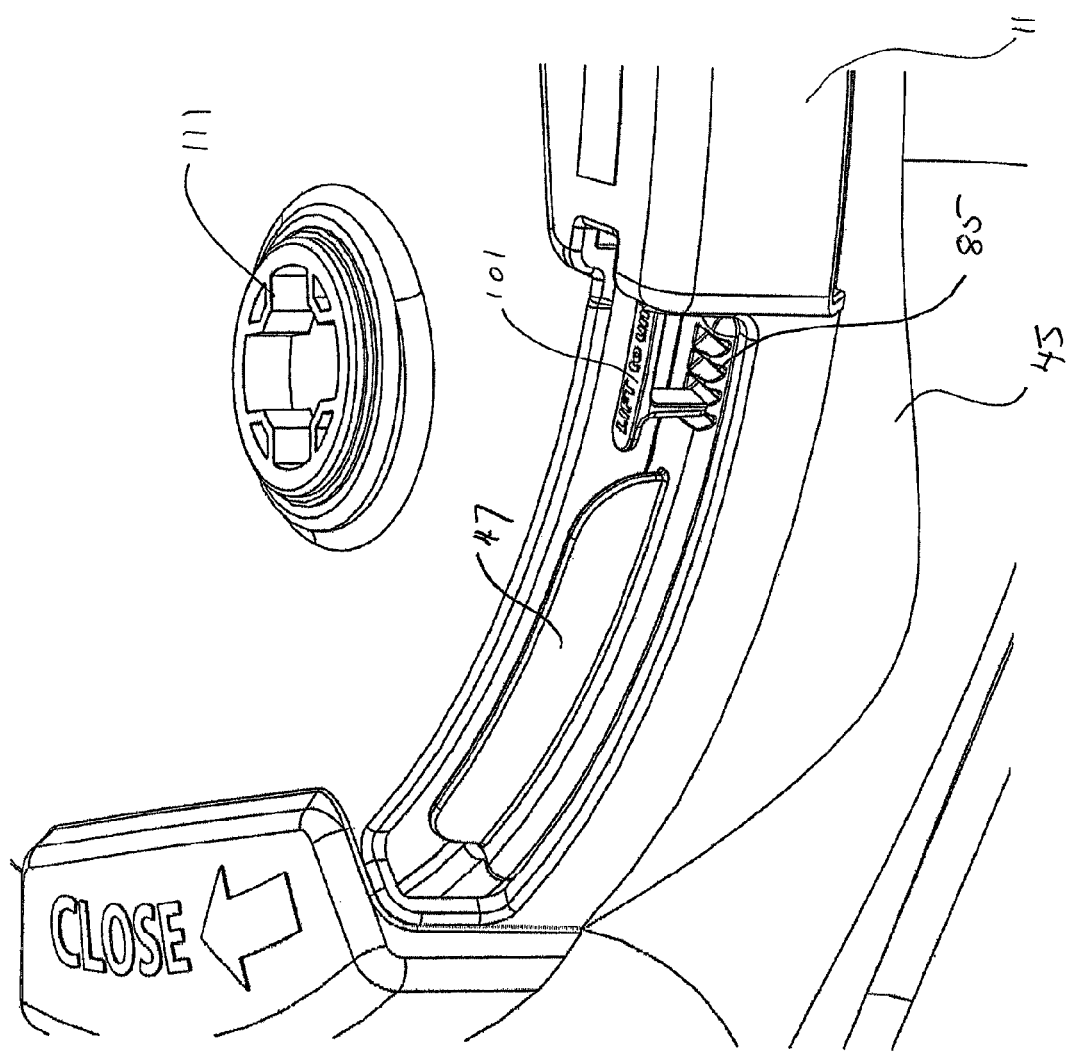
FIG. 14 shows an enlarged view of a section of the container and closure assembly.
Figure 16:
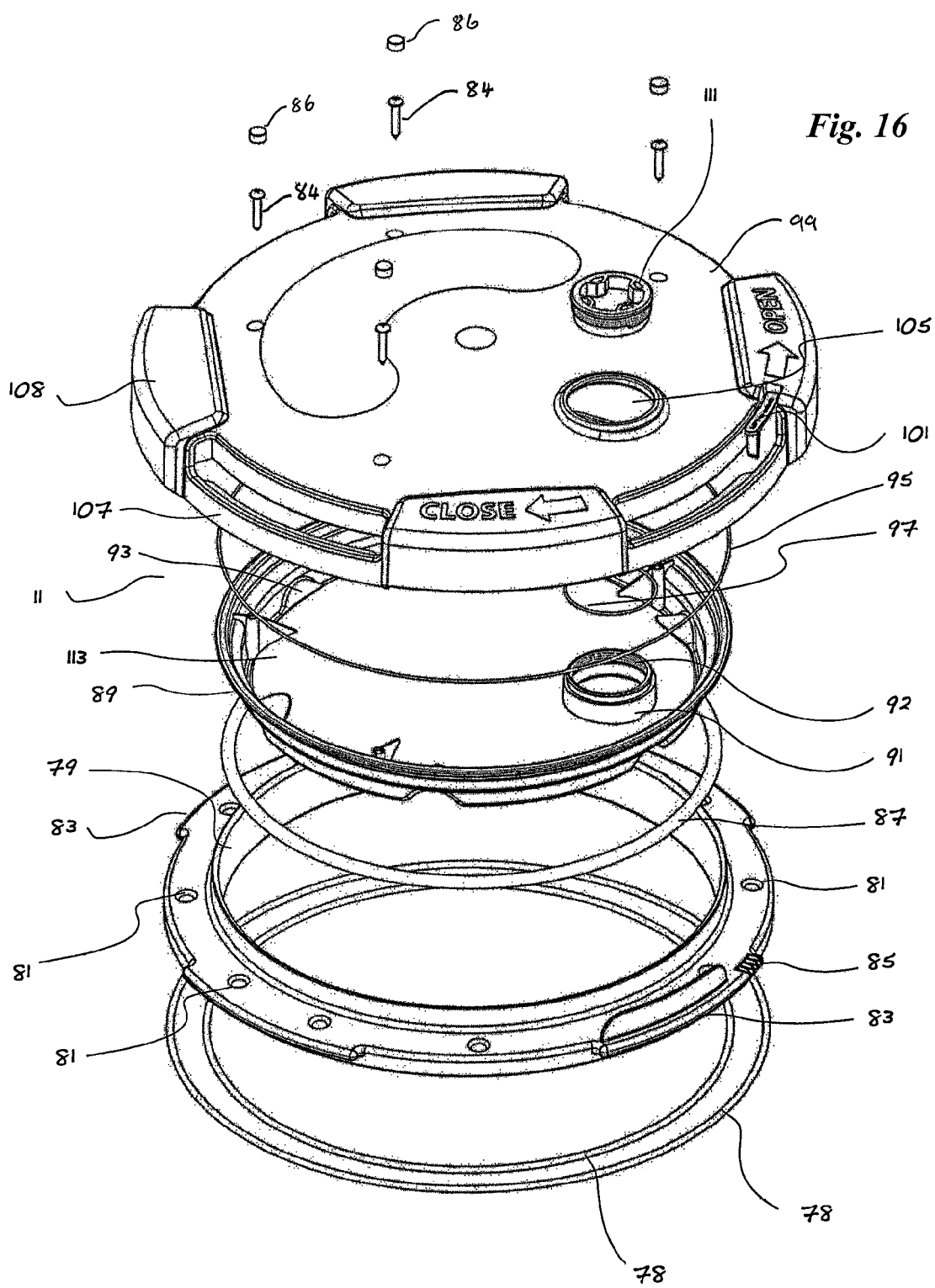
FIG. 16 shows an exploded view of the closure assembly.

Referring to FIGS. 16 and 17, the closure assembly 11 comprises a closure base 77 having a wide opening 76. The closure base 77 is adapted to be bolted to the top of the container. Two O-rings 78, as shown more clearly in FIG. 9, provide a seal between the container finish and the closure base. The closure base has a sealing surface 79 angled with respect to the vertical so that when the components of the closure assembly telescopically are put together, the O-ring 87 will become compressed between the annular sealing surface of the intermediate member 89 and the annular sealing surface 79 to provide an effective seal. As the angling of the sealing surface 79 means that the top of the opening defined by the sealing surface 79 is slightly wider than the bottom of the opening, removal of the O-ring and other components of the closure assembly is facilitated by the release of pressure as the closure components are lifted.

A plurality of holes 81 are provided around the closure base whereby to allow screws and/or bolts to be used to secure the closure base to the finish of the container 3.

The closure base includes a plurality of projections 83 which are adapted to co-operate with complementary projections 109 on the cap 99 when the closure is assembled and the cap 99 is rotated ⅛ turn with respect to the closure base 77.

When the cap is rotated to seal the closure in this fashion, the locking lug 101 comes into engagement with the ratchet surface 85 whereby to lock the cap in the closed position. To unlock the cap, it is necessary to lift the locking lug out of engagement with the ratchet surface prior to unscrewing the cap. Optionally screws 84, which pass through the cap into the intermediate member 89, may also be used to lock the cap. Covers 86 may be provided to cover the tops of the screws.

When the cap has been locked shut, the seal display 47 provides visual confirmation that a seal has been achieved. Conversely, when the cap has not been rotated shut, the seal display will be hidden behind one of the bridges 108 on the cap 99.

The cap 99 has a domed top panel 100 joined to a skirt 107 by four bridges 108 separated by gaps 48.

The domed top panel 100 includes an opening 105 which is adapted to telescopically overlie the neck 91 of the intermediate member 89. The neck includes an internal thread 92 into which the plug 111 may be screwed.

A plurality of air bleed ribs 93 are arranged around the perimeter of the intermediate member 89. This is to allow air to bleed from the gap 112 shown in FIG. 9 into the domed section 113 of the intermediate member 89 and ultimately through the opening 105 as the container is filled.

An O-ring 95 provides a seal between the cap and the upper perimeter of the intermediate member and the O-ring 97 provides a seal between the neck 91 and opening 105.

The construction of the closure assembly is such that the container 3 can be accessed for filling through the relatively narrow neck 91 when the plug 111 is removed. When access to the interior of the container 3 is required for purposes such as cleaning, the cap 99 and intermediate member 89 may be removed to expose the wide opening 76. Suitably the wide opening 76 is at least twice as large as the internal opening of the neck 91.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A fluid container assembly comprising,
    a container of moulded polymeric material having a plurality of sides, a bottom and a top, wherein the sides are bowed inwardly with respect to the interior of the container, the top and bottom are bowed outwardly with respect to the interior, and the sides are joined to form corners,
    an open mouth formed on the top,
    a separate base for supporting the bottom of the container,
    a corner reinforcing post for each of the corners, each corner reinforcing post extending from the separate base along one of the corners, and
    a drainage opening,
    wherein the top is shaped to direct air contained within the container to flow out of the mouth as the container is filled with liquid,
    the bottom of the container is shaped so as to direct fluid to flow under gravity to the drainage opening when the container assembly stands on level ground,
    the thickness of the sides, bottom and top of the container are set to provide that the oxygen transmission characteristics of the container result in an oxygen transmission rate from air at standard temperature and pressure, into wine stored in the container at between 7 milligrams and 35 milligrams of oxygen per liter of wine per year, and
    the separate base is mounted on a base frame which is constructed to allow access beneath the fluid container assembly for the tynes of a forklift.

2. The fluid container assembly of claim 1 wherein the container comprises four sides, the corners are formed with corner recesses for receiving the corner reinforcing posts and the container comprises polyethylene.

3. The fluid container assembly of claim 2 wherein each of the four sides is provided with two side recesses adapted to receive reinforcing side posts and the capacity of the container is between 500 liters and 10,000 liters.

4. A fluid container assembly comprising,
- a container of moulded polymeric material having a plurality of sides, a bottom and a top, wherein the sides are bowed inwardly with respect to the interior of the container, the top and bottom are bowed outwardly with respect to the interior, and the sides are joined to form corners,
- a separate base for supporting the bottom of the container,
- a corner reinforcing post for each of the corners, each corner reinforcing post extending from the separate base along one of the corners, and
- the separate base is mounted on a base frame which is constructed to allow access beneath the fluid container assembly for the tynes of a forklift.

5. The fluid container assembly according to claim 1 wherein the fluid container assembly covers a surface area substantially the same as a standard pallet.

6. The fluid container assembly according to claim 5 wherein the container comprises rotationally moulded polyethylene and has a capacity of 800 liters to 1,200 liters.

7. The fluid container assembly according to claim 4 wherein the bottom of the container is shaped so as to direct fluid to flow under gravity to a drainage opening when the container assembly stands on level ground.

8. The fluid container assembly according to claim 7 wherein the drainage opening is located in a recess formed in a substantially central position in a side wall of the container.

9. The fluid container assembly according to claim 1 comprising a top assembly adapted to be mounted on top of the container, wherein the top assembly extends over the corners and is adapted to receive and hold the corner reinforcing posts.

10. The container assembly according to claim 1 wherein the top comprises a closure assembly mounted on the open mouth formed on the top.

11. The container assembly according to claim 10 wherein the closure assembly is constructed so as to provide two circular openings of different diameter to allow access to the container for cleaning and filling.

12. The container assembly according to claim 1 comprising at least one rib formed in the top, the at least one rib being shaped to facilitate flow of air to the container mouth.

13. The container assembly according to claim 1 wherein a foot is located at each of four corners of the base frame and each foot is adapted to hold a corner reinforcing post.

14. The container assembly according to claim 13 wherein the base frame is provided with a tubular leg at each of four corners of the base frame and each corner reinforcing post telescopically fits through a respective tubular leg into engagement with a respective foot.

15. The container assembly according to claim 13 wherein the base frame is metal and comprises side bars joined by cross bars.

16. The container assembly according to claim 15 comprising a plurality of hoops fitted to the cross bars to receive the tynes of a forklift.

17. The container assembly according to claim 13 wherein each foot is shaped to receive the top of a corner post and each corner post is long enough to be received in a corner post of another fluid container assembly stacked thereon.

18. The fluid container assembly according to claim 6 wherein the drainage opening is located in a recess formed in a substantially central position in a side wall of the container.

19. The fluid container assembly according to claim 4 wherein the container comprises polyethylene and the thickness of the sides, bottom and top are set to provide that the oxygen transmission characteristics of the container result in an oxygen transmission rate from air at standard temperature and pressure, into wine stored in the container at between 7 milligrams and 35 milligrams of oxygen per liter of wine per year.

\* \* \* \* \*